T. V. BELL.
TOOLING MACHINE FOR BOOKBINDING.
APPLICATION FILED APR. 20, 1908.

979,367.

Patented Dec. 20, 1910.

WITNESSES

INVENTOR
THOMAS V. BELL.

UNITED STATES PATENT OFFICE.

THOMAS VINCENT BELL, OF OUTREMONT, QUEBEC, CANADA.

TOOLING-MACHINE FOR BOOKBINDING.

979,367. Specification of Letters Patent. Patented Dec. 20, 1910.

Application filed April 20, 1908. Serial No. 428,286.

*To all whom it may concern:*

Be it known that I, THOMAS VINCENT BELL, of the town of Outremont, in the Province of Quebec and Dominion of Canada, have invented certain new and useful Improvements in Tooling-Machines for Bookbinding, of which the following is a full, clear, and exact description.

My invention relates to improvements in tooling machines and the objects are, first, to provide a simple and inexpensive machine for forming the transverse lines on the backs of books in the process of binding; and second, if it is desired, to apply gold leaf thereto.

A further object is to provide a machine in which the operator places the book on a table which may be moved smoothly and easily into contact with the disks and tilted so as to give an even impression across the whole back of the book.

A still further object is to provide a continuous and easily regulated disk heating mechanism.

To accomplish these objects I provide a series of tooling disks revolubly mounted on the lower extremities of pivoted levers which may be moved through a predetermined angle. In front of the disks, is a table pivotally attached to the lower extremities of a pair of hangers which are pivoted to the frame of the machine at their upper extremities. A disk heating device at the back of the disks completes the device.

Figure 1:
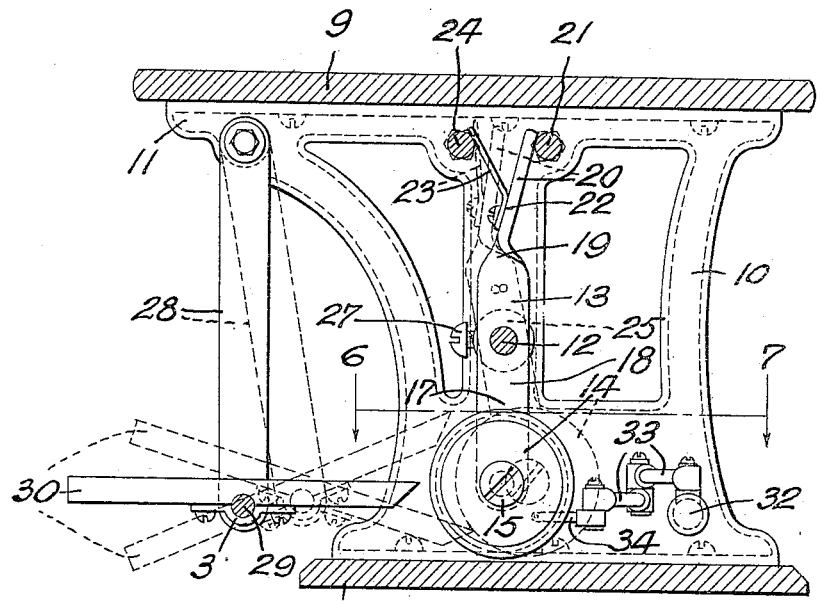
Figure 3:
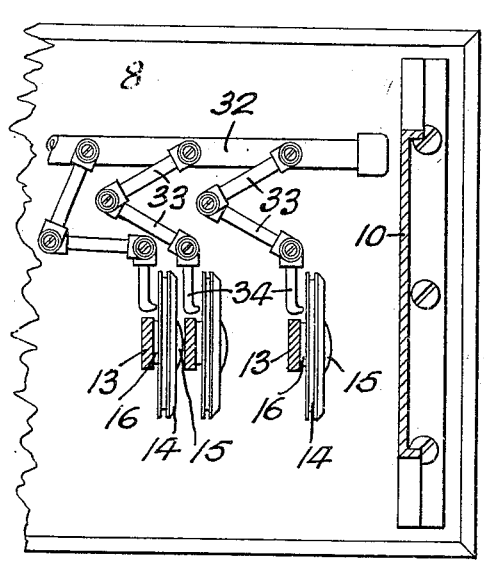
Figure 2:
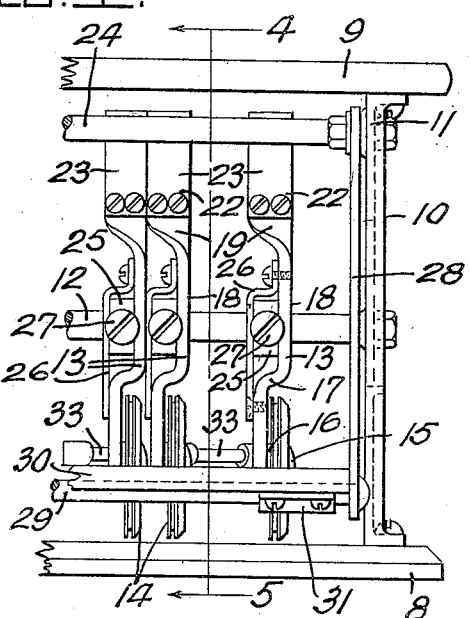

In the drawings which illustrate my invention:—Figure 1 is a vertical sectional view on the line 4—5 of Fig. 2. Fig. 2 is a partial front elevation of the machine. Fig. 3 is a horizontal sectional view on the line 6—7 of Fig. 1, and shows the disk heating mechanism.

In the above defined figures, 8 designates the base board of the apparatus, 9 the top thereof, and 10 the end frames having forwardly projecting upper portions 11. A horizontal rod 12 extends between the end frames 10 and supports a plurality of levers 13 pivotally mounted thereon. A tooling disk 14 is revolubly secured to the lower extremity of each lever by a screw 15 and separated therefrom by a washer 16. The levers 13 are offset at 17 between the disks and the rod 12 so as to bring the sides 18 of the levers in line with the outer sides of the disks. The levers are twisted at right angles at 19 above the rod 12 and bent rearwardly so that when the bodies of the levers are vertical, the extremities of the portions 20 rest on the stop bar 21. It will be noticed in Fig. 2 that at the twist 19 the levers are again offset so that the edges 22 of the portions 20 are in line with the sides 18 of the levers 13. A flat spring 23 is fixed to the portion 20 of each lever immediately above the twist 19 and extends forwardly and upwardly until its extremity engages the stop bar 24. Both the stop bars 21 and 24 extend from one end frame to the other and lie parallel to the rod 12. Loose collars 25 are placed on the rod 12 and held in contact with the levers 13 by the straps 26 secured to said levers. It will be noticed in Fig. 2 that these collars lie on the opposite sides of the levers from the disks and occupy the depressions between the offsets therein. The collars may be fixed to the rod 12 at any desired point by means of set screws 27, thus locking the levers and disks against lateral motion at any point on the rod 12.

Pivoted to the portions 11 of the end frames 10, is a pair of hangers 28, the lower extremities of which are connected by a bar 29. A table 30 is balanced across the bar and pivotally mounted thereon by the bearings 31. It will be seen by the dotted lines in Fig. 1 that the table, which normally lies horizontally and out of contact with the disks 14, may be swung into contact therewith and may be tilted on its own axis so that the whole of the curved back of a book lying thereon may be brought into contact with the edges of the disks 14, which will yield so as to give an even pressure at all points. The springs resting against the stop bar 24 will return the levers and disks to their normal positions on the removal of the pressure.

In applying gold leaf to a book back, the disks are heated and press the gold leaf into the binding, the heat rendering the binding sufficiently adhesive to hold the gold leaf, as is well known.

A gas main 32 is located in the rear of the disks and a series of gas brackets 33, preferably three-jointed, are mounted on the main 32 and provided with nozzles 34 adapted to direct a gas flame against each of the disks 14 as near the center as possible, thus insuring an approximately equal temperature around the entire circumference of the disks.

The operation of the device consists in adjusting the disks in any desired relation by loosening the screws 27 and sliding the levers and collars on the rod 12. The screws 27 are then tightened to lock the levers against lateral movement. A book to be tooled is placed on the table and the table swung forwardly and upwardly until the book comes in contact with the disks. The table is then tilted so that the whole back of the book is brought in contact with the edges of the disks, which recede and revolve with the pressure. The gas brackets are adjusted to heat the disks, which, it will be seen in Fig. 3, can be readily accomplished owing to the three joints in the brackets.

It will be readily seen from the foregoing description that I have provided a device that will attain all the objects set forth and the advantages of which will be obvious to those skilled in book binding.

Having thus described my invention, what I claim is:—

1. A tooling machine comprising a series of yieldably mounted tooling disks, and means for heating said disks.

2. A tooling machine comprising a series of yieldably mounted tooling disks, means for heating said disks, and a pivoted table movable to and from said disks.

3. A tooling machine comprising a series of revoluble tooling disks, a rod parallel with the axis of said disks, a series of disk carrying levers longitudinally movable on said rod, and means for heating said disks.

4. A tooling machine comprising a rod, a series of disks carrying levers longitudinally movable thereon, disks revolubly mounted on said levers, means for locking said levers at any point on said rod, means for limiting the movement of said levers, means for heating the disks, and a pivoted table movable to and from said disks.

5. A tooling machine comprising a casing, a rod mounted therein, a series of levers pivotally and slidably mounted thereon, means for locking said levers at any point on said rod against longitudinal movement, a series of disks revolubly mounted on said levers, resilient members attached to said levers, a stop bar normally engaging said levers, a second stop bar normally engaging said resilient members, a fuel main, a series of flexible pipes for directing a flame against said disks, a pair of straps pivoted at one extremity to the casing, and a table pivoted to the opposite extremity of said straps.

In witness whereof I have hereunto set my hand in the presence of two witnesses.

THOMAS VINCENT BELL.

Witnesses:
ARTHUR M. LAUP,
N. HENDERSON.